United States Patent [19]
Mahoney et al.

[11] Patent Number: 5,819,271
[45] Date of Patent: Oct. 6, 1998

[54] CORPORATE INFORMATION COMMUNICATION AND DELIVERY SYSTEM AND METHOD INCLUDING ENTITLABLE HYPERTEXT LINKS

[75] Inventors: John J. Mahoney, Princeton Junction; Mary Ellen McCarthy, Atlantic Highlands, both of N.J.; James M. Tousignant, Hartsdale, N.Y.; Isaak Karaev, Brooklyn, N.Y.; George Baird, New York, N.Y.; Paul Blazek, Forest Hills, N.Y.

[73] Assignee: Multex Systems, Inc., New York, N.Y.

[21] Appl. No.: 739,377

[22] Filed: Oct. 29, 1996

Related U.S. Application Data

[63] Continuation-in-part of Ser. No. 658,966, Jun. 4, 1996.
[51] Int. Cl.[6] .................................................. G06F 17/30
[52] U.S. Cl. .................................. 707/9; 707/10; 707/104
[58] Field of Search .................................... 707/9, 10, 104

[56] References Cited

U.S. PATENT DOCUMENTS

| | | | |
|---|---|---|---|
| 5,089,956 | 2/1992 | MacPhail | 707/1 |
| 5,247,661 | 9/1993 | Hager et al. | 707/104 |
| 5,262,942 | 11/1993 | Earle | 705/37 |
| 5,265,242 | 11/1993 | Fujisawa et al. | 707/3 |
| 5,285,383 | 2/1994 | Lindsey et al. | 705/26 |
| 5,297,031 | 3/1994 | Gutterman et al. | 705/37 |
| 5,297,032 | 3/1994 | Trojan et al. | 705/37 |
| 5,301,350 | 4/1994 | Rogan et al. | 705/33 |
| 5,321,750 | 6/1994 | Nadan | 380/20 |
| 5,329,619 | 7/1994 | Page et al. | 395/200.33 |
| 5,333,246 | 7/1994 | Nagasaka | 345/433 |
| 5,410,693 | 4/1995 | Yu et al. | 707/100 |
| 5,438,508 | 8/1995 | Wyman | 705/8 |
| 5,502,637 | 3/1996 | Beaulieu et al. | 705/36 |
| 5,511,156 | 4/1996 | Nagasaka | 345/433 |
| 5,513,126 | 4/1996 | Harkins et al. | 395/200.58 |
| 5,537,586 | 7/1996 | Amram et al. | 707/3 |
| 5,539,865 | 7/1996 | Gentile | 395/115 |
| 5,708,780 | 1/1998 | Levergood et al. | 395/200.59 |
| 5,710,886 | 1/1998 | Christensen et al. | 705/14 |
| 5,721,908 | 2/1998 | Lagarde et al. | 707/10 |
| 5,724,424 | 3/1998 | Gifford | 380/24 |

FOREIGN PATENT DOCUMENTS

| | | |
|---|---|---|
| 0 701 220 A1 | 3/1996 | European Pat. Off. . |
| WO 91/01608 | 2/1991 | WIPO . |
| WO 93/15466 | 8/1993 | WIPO . |
| WO 95/33236 | 12/1995 | WIPO . |

OTHER PUBLICATIONS

"Multex Publisher™", Multex Systems, Inc., copyright 1994, 6 pages.

"Multex Contributor User Guide", Multex Systems, Inc., 36 pages.

Gupta, Udayan, "From The Inside Out," *Information Week*, May 22, 1995, 3 pages.

(List continued on next page.)

*Primary Examiner*—Wayne Amsbury
*Attorney, Agent, or Firm*—Kenyon & Kenyon

[57] ABSTRACT

An integrated computer-implemented corporate information delivery system. A database stores research reports produced by and received electronically from brokerage firms. Authorization information specifies who is authorized to access each research reports. The database also stores corporate information about a number of corporations. Each item of corporate information is produced by and received electronically from one of the corporations about that corporation. Authorization information specifies who is authorized to access each item of corporate information. A research delivery module allows a user to submit a query and receive query results listing research reports and corporate information satisfying the query and that the user is authorized to access. A corporate register module outputs corporate information, the corporate information output according to a common format. The corporate information may be distributed via the Internet.

35 Claims, 4 Drawing Sheets

OTHER PUBLICATIONS

GFI News Release, 2pgs, Jun. 5, 1996, New York.

Inside Market Data, The Newsletter of Electronic Financial Information, 3 pgs.., Jun. 17, 1996, Waters Information Services, Inc.

Multex News Release, Multex Systems, Inc. Doubles Its Private Capital Financing, 2 pgs., Jun. 5, 1996.

Multex News Release, Multex Systems, Inc. Aligns With Top Wall Street Information Providers, 2 pgs., Jun. 5, 1996.

SIA Report Market Pulse, Multex Raises Capital; Signs with Reuters, Bloomberg, GFI, Wall Street & Technology, 1 pg., Aug. 1996.

Bloomberg–Multex Research, 2 pgs., Bloomberg Financial Markets Commodities News.

| Refresh | Query | Summary | AM Notes | View All | Long Form | | *Bulletin Board* 130 |
|---|---|---|---|---|---|---|---|

Latest 100 of 143 Documents — 132                     135 — Corp. Register

| Submit | Company | Pgs | Size | Symbol | Syn | Headline |
|---|---|---|---|---|---|---|
| 10:41AM | Equitable Securities | 3 | 72K | | | Roper Industries |
| 10:39AM | IBM | 2 | 75K | IBM | | Press Release: Bette |
| 10:39AM | Equitable Securities | 3 | | | | Leggett & Platt |
| 10:37AM | Punk, Ziegel & Kn... | 1 | 51K | HPS | | HealthPlan Service |
| 10:36AM | Microsoft Corp. | 2 | 17K | MSFC | | Annual Report 1996 |
| 10:35AM | Merrill Lynch | 2 | 12K | CNG | Yes | CONSOL NAT GAS: A |
| 10:21AM | Merrill Lynch | 2 | 55K | | | Strategy Updates |
| 10:18AM | INTEL | 6 | 64K | | | 10-Q |
| 10:18AM | ING Barings | 11 | | SKODA... | | Eastern Europe Da |
| 10:14AM | Merrill Lynch | | 35K | MLNONO | | CURRENT RESTRICTI |
| 10:14AM | Janney Montgomery | 2 | | ADCO | | Adco Technologies |
| 10:14AM | Merrill Lynch | 1 | 57K | MLNO24 | | 24-Hour Restricti |
| 10:14AM | Janney Montgomery... | 7 | 469K | | | Statistical Pages |
| 10:14AM | Janney Montgomery... | 86 | 172K | ANST M... | | Mid-Atlantic Revi |
| 10:04AM | Brown Brothers Ha... | 15 | 52K | CL HNZ... | | Colgate Palmolive |
| 10:02AM | Merrill Lynch | 2 | | HNKDF | | HANKYU DEPT.: Lowe: |

CORPORATE INFORMATION COMMUNICATION AND DELIVERY SYSTEM AND METHOD INCLUDING ENTITLABLE HYPERTEXT LINKS

RELATED APPLICATION

This application is a continuation-in-part of U.S. patent application, Ser. No. 08/658,966, filed on Jun. 4, 1996, now pending.

FIELD OF INVENTION

The present invention is directed to a computer-based system and method for the electronic distribution of corporate information, and more particularly, for the distribution of such information via the Internet in conjunction with a Wall Street research information delivery system, such information including ENTITLABLE hypertext links.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

Corporations spend large sums of money creating, printing and distributing their annual reports (and other financial/investment documents) to shareholders and investment advisors. An annual report presents the corporation's view of its financial performance, and, in its presentation and format, often makes a statement about the style, direction and philosophy of the corporation. However, many recipients of these reports do not spend much time reading them. Further, an investor, analyst or investment advisor, when reviewing a corporation's performance, may not have the most recent annual report of the corporation readily available. It would be beneficial (for both the corporation and the investor) if the annual report produced by a corporation could be made available to those interested at the time of that interest.

Corporations also spend large sums of money on investor relations programs in order to, for example: be viewed as a first tier, quality stock and sound investment vehicle; seek a fair valuation for the price of the corporation's stock; reduce volatility by providing guidance to investors and attracting long-term investors; make the corporation's business more understandable; reinforce sales, marketing and product messages; and interpret and explain corporate philosophy, all so that investors will maintain and add to their investment in the corporation.

Corporations often wish to distribute to interested parties other corporate information, such as, for example, 10-K and 10-Q statements, press releases, quarterly faxes to analysts, etc. A corporation may wish to distribute this information generally or to a select audience.

Employees of brokerage and investment banking firms often have access to electronic document delivery systems, such as the Multex Publisher™ Research Viewer program, by Multex Systems, Inc. of New York, N.Y. or the Bloomberg-Multex Research system. Bloomberg-Multex Research, for example, is a real-time global research service that allows major brokerage firms to distribute publication-quality research information to their institutional clients including portfolio managers, analysts and traders. Information that is distributed on such systems include recommendation changes, morning notes, report headlines and full length research reports. This information is produced by brokerage firms and is distributed in a page description format reflecting the layout of the corresponding printed research report. It would be beneficial if investors, portfolio managers, investment brokers and traders could also access, at a single site, using a single integrated system, the wide array of information that is produced by the subject corporations themselves, such as, for example, annual reports, as well as profiles designed to highlight those features of a corporation and its strategy that are of particular relevance to investors.

When investors, portfolio managers and traders search electronic databases of research reports produced by brokerage firms, it would be also useful to search (and return as part of the search results) the text of corporation's annual reports, Internet web sites and other corporate-produced documents. This would provide the investors, portfolio managers and traders with additional information that would be useful in making investment decisions and recommendations. Unfortunately, existing databases systems used by investors and analysts provide limited information. Research distribution systems include research reports but not corporate web sites or annual reports, the EDGAR database includes 10-K and 10-Q filings but not brokerage firms research reports or corporate web sites, Internet search engines search web sites and some public databases but not brokerage firms research reports or most corporation's annual reports. The complex and time consuming search process needed to gather all of this diverse information is incompatible with investors' need for rapid, easy access to time sensitive data.

Thus, there exists a need for an integrated information delivery system that meets the needs both of corporations (to have annual reports and other corporate information delivered to interested investors, advisors and analysts) and of investors (to quickly access a wide variety of sources when researching a corporation).

Current computer technology allows documents and other information to be distributed electronically, from computer to computer. Electronic distribution is generally cost effective when compared with hard copy distribution methods. Global computer networks, such as the Internet, enable information to be distributed to a wide range of people at locations around the world. One of the many advantages of the Internet, particularly the World Wide Web ("WWW"), is that the communication protocols used are non-proprietary, thus enabling end users to access and use the Internet without the need for customized hardware or software. Further, information on the WWW can be formatted and presented in sophisticated ways, e.g., using color, various fonts, typefaces and layouts, graphics, animations, sounds, pictures, etc.

Some corporations take advantage of current Internet technology and make their annual reports available on the WWW for access by the public. However, it is often difficult to locate such annual reports (if any) in a corporation's web site. Further, the annual reports of each corporation are presented on the WWW in a variety of formats (e.g., different frames, page layouts, hyperlink navigation maps, etc.) making it difficult for the investment community to quickly and efficiently conduct research.

Often, a corporation wishes to provide information on a controlled basis. For example, the corporation may want to provide information (e.g., detailed financial data or specialized product information) only to shareholders or to certain analysts. Additionally, the corporation may require that the format of the information provided to one person be different from the format of the same information provided to another person or class.

Further, some users of the information only may be interested in certain types of information available from a particular corporation.

When providing information via the WWW, information providers can, in a crude way, "customize" the information for a user. One simple example of customization is providing the user with the results of a query. Here, the user submits a query to the web server, e.g., by completing a form, and, based on the user's request, the web server creates a web page (or form) comprising information satisfying the query and transfers this web page (or form) to the user's browser program for display. In such systems, the program used to create the web page (or form) is "hard coded", so that if the information provider wishes to change the format of the information, this program must be recoded or replaced. Recoding or replacing such programs is inefficient and often time consuming.

Further, every user who submits the same query to the web server will receive the same results in the same format. Existing methods of providing information to WWW users do not enable different users to be automatically provided with different views of the information. Thus, a procedure is needed to enable the provision of customized views of requested information to WWW users.

Thus, there exists a need for a system for the electronic distribution of corporate information to those who a permitted to have access to and wish to access the information.

When a corporation distributes corporate information (e.g., an annual report), it would be useful if the corporation was provided with information as to whether investors read and found the report useful. However, potential investors may not wish that third parties track the subject of their investment research. Accordingly, there is a need for a system that provides feedback to corporations as to use of their corporate information without disclosure of activities that may be regarded by investors as confidential.

SUMMARY OF THE INVENTION

The present invention provides an electronic corporate information communication and distribution system integrated with an electronic brokerage research delivery system. The present invention allows remote users to receive, access and query corporate information in electronic form.

As used herein, the term "corporate information" means information produced or sponsored by a corporation, partnership, firm or other legal entity about its business, such as, for example, information contained in annual reports, quarterly reports, SEC filings and press releases, information about upcoming events, latest news about the entity, recent management presentations, briefings for analysts and portfolio managers, and the like. For ease of reference, the corporate information communication and distribution component of the present invention is called herein the "Corporate Register."

The Corporate Register is seamlessly integrated with an Internet-based electronic research delivery system and can also or alternatively be integrated with other research delivery systems using server-based platforms. One example of an electronic research delivery system is the MultexNet™ service from Multex Systems, Inc., described in the parent patent application "Information Delivery System and Method", Ser. No. 08/658,966, which is expressly incorporated herein by reference. The representative embodiment of the present invention integrates the Corporate Register with the MultexNet service but does not preclude other related methods of delivery, for example, systems such as Multex Publisher.

In summary the electronic research delivery system of the present invention comprises proprietary information produced by brokerage firms. The Corporate Register comprises corporate information.

The corporation's view of events, competition, etc. often differs sharply from that of brokerage firms. Therefore, providing a system that presents both views in an integrated fashion provides investors with additional information useful in making investment decisions and recommendations.

Although seamlessly integrated, a user may be permitted to have access to only the Corporate Register or the electronic research delivery system.

In the representative embodiment of the present invention, the basic corporate information is made available to users in HTML format, so as to be accessible by a browser program, such as the Netscape Navigator program or the Microsoft Internet Explorer program. The corporate information may include or be linked to information in other formats, e.g., spreadsheets accessible by a common spreadsheet program, audio files accessible by a media player, etc.

The information in the Corporate Register is made available to users according to a common page layout and navigation path. This enables users to become familiar with the format for corporate information, so as to easily find required information and to speedily compare like information of different corporations. In the representative embodiment, for example, the corporate information for each corporation is arranged in two frames, namely, an index frame and a contents frame. The index frame includes a topic hyperlink to various segments or types of the corporate information, e.g., "corporate highlights", "latest news", "upcoming events", "recent management presentations", "annual and quarterly reports", and "SEC documents". Ideally, the index frame will have mostly the same entries for each corporation. The index frame can be displayed at all times, e.g., in a frame shown in the browser.

The contents frame includes the corporate information, arranged and navigatible according to the topics listed within the index frame. Again, for consistency, similar headings in each topic can be used by each corporation. For example, the "corporate highlights" topic may include headings (as hyperlinks) for "investment highlights", "growth strategy", "product groups" and "financial highlights". Selecting a heading will cause the corresponding corporate information to be retrieved and displayed in the contents frame.

The actual contents (e.g., the corporate information) and the format of the actual contents as displayed in the contents frame is determined by the corporation itself. Thus, the "look and feel" of the actual contents may mirror the corporation's annual report and/or reflect the style, philosophy and vision of the corporation as seen by the corporation.

In short, the contents frame comprises information provided by the corporation output according to the corporations's layout and specification, all within the overall consistent framework of the Corporate Register as "specified" in the index frame and headings. This allows corporations to control their content and format and at the same time enable users to easily locate desired information.

It is expected that the Corporate Register and the electronic research delivery system could be controlled and maintained by a third party intermediary, called herein the Network Manager. In the representative embodiment, the Network Manager is responsible for the overall design and operation of the Corporate Register. For example, the Network Manager could supply blank formatted page outlines to corporate participants, which the corporate participants complete (e.g. by adding content) and return to the Network Manager. The blank formatted page outlines (completed and uncompleted) can be transferred between the Network Manager and the corporations electronically, e.g., by file transfer protocol over the Internet.

A typical user would access the Corporate Register from the electronic research delivery system. For example, when new corporate information was made available by the corporation, the user (if authorized to access such information) would see a reference to that information on the screen of the electronic research delivery system. The user could then select the reference to that new entry (e.g., the reference to the new entry would be displayed as a hyperlink) and this would cause the Corporate Register to be displayed showing the contents of the new entry (e.g., the browser would become active and would retrieve the page(s) with the appropriate information.) As another example, if the user in the electronic research delivery system conducted a search for "IBM", the results would include (along with typical results of such a search in a research delivery system, e.g., morning notes and research reports) reference to IBM's entry in the Corporate Register, which could then be selected as above. As another example, the user could conduct a full-text search for a particular phrase (e.g. "power plant") and the returned results would include reference to relevant Corporate Register entries that contain that phrase (along with typical results of such a search, e.g., morning notes and research reports, that contain that phrase).

From the Corporate Register, the user has the option of selecting an entry to the electronic research delivery system, which will cause an electronic research delivery system screen (e.g., a MultexNet screen) to be displayed, either at an opening screen or showing the results of a search relating to the corporation whose entry was immediately previously viewed in the Corporate Register.

Thus, the present invention allows investors to access corporate information when the investor wishes to do so. Further, a user of an electronic research delivery system will have more complete information than currently available.

As an additional feature, the integrated system of the present invention can include links to a corporation's WWW web site. For example, one entry in the index frame of the Corporate Register may be a hypertext link to that corporation's web site. Alternatively or additionally, the text in the index frame (e.g., the corporate information) may include hypertext entries not only to other parts of the Corporate Register but also to WWW web pages selected by the corporation. As another example, if the user in the electronic research delivery system conducted a search for "IBM", the results would include (along with typical results of such a search, e.g., morning notes and research reports) reference to IBM's WWW web site, which could then be selected and moved to by the user. As another example, the user could conduct a full-text search for a particular phrase (e.g. "automobile tires") in the electronic research delivery system and the returned results would include reference to relevant WWW web sites/pages that contain that phrase (along with typical results of such a search, e.g., morning notes and research reports, that contain that phrase). To enhance the value of the information provided this way, only those WWW web sites/pages selected either by the participant corporations or the Network Manager as containing appropriate information would be indexed and included in such search results.

Thus, the Corporate Register is seamlessly integrated with the electronic research delivery system, for example, allowing one search in the electronic research delivery system to return search results including both research reports produced by brokerage firms and corporate information produced by corporations.

In the representative embodiment, the information that is provided to users is stored in electronic form at a central server, called a repository server. Ideally, users communicate with the repository server via the Internet. The repository server is coupled to the Internet by a web server. The repository server comprises or is coupled to a plurality of databases of information, including corporate information and research reports, stored in electronic form.

The web server includes a web server program. The web server also includes a web server helper application, such as, for example, the Common Gateway Interface (CGI) program, BGI, SAPI or ISAPI.

According to the representative embodiment of the present invention, each user has a user computer, such as, for example, a personal computer with an Intel Pentium processor and a fast modem that the user can use to connect to the Internet. The user computer has one or more local storage devices. In the representative embodiment, the user computer executes Netscape's Navigator 3.0 browser program. However, other browser programs, such the Mosaic browser or Microsoft's Internet Explorer 3.0 browser could also be used. As used herein, the browser programs executed by the user computer will be termed "browsers."

When the user initially accesses the web server, the user is required to provide a user identification code ("ID") and a password. The web server submits a login request to the CGI program to verify that no other user is using the same ID.

Once the user has provided the ID and password, the repository server will determine what information that user is authorized to receive. According to the present invention, each user has authorization to access all or a subset of the information stored at the repository server. Thus, different users may be permitted to access different subsets of the documents stored at the central repository. Further, the corporation can regularly monitor use access lists and modify those lists as desired. Such monitoring and modification can take place from remote computers, for example, over the Internet.

Each corporation submitting corporate information has the option of specifying those users or classes of users who are authorized to access that item of information. Additionally, an item of corporate information can be divided into parts or pages, and different users may be permitted to access different parts or pages of the information.

As states above, hypertext links (e.g., to WWW web sites) may be included in each item of corporate information in the Corporate Register. The corporation may specify that different users be shown different links, or that a link may have different meaning depending on the user. For example, a link in an annual report to detailed sales figures may link a shareholder to a summary chart on the corporation's public web site, and link a corporation employee to a detailed spreadsheet on corporation's intranet, and link a specified analyst to a simplified spreadsheet on a limited access WWW page. As another example, an e-mail link (a link that provides an e-mail address and activates an e-mail client) may provide the e-mail address of the chairman for the largest stockholder and an important analyst, may provide the e-mail address of the corporation's shareholder relations department for all shareholders, and provide no link for others. This feature enables hypertext links in documents to be ENTITLABLE, as specified by the corporation or other party.

The present invention has capabilities to provide usage information to participating corporations as to access and usage of corporate information in the Corporate Registry. For example, overall summaries could be provided, e.g., that 25% of users accessed Microsoft corporate information, that 400 people read the IBM annual report, and of these, 30% jumped to the IBM WWW site, etc. This type of information is useful to corporations, and at the same time keeps secure the possible investment and research strategies of individual users.

Preferably, the repository server is coupled to one or more remote contributor workstations. Some of the information that is stored at the repository server can be received from the contributor workstations in electronic form. Typically, the contributor workstations are used by brokerage firms to submit research reports and corporations to submit items of corporate information. According to the representative embodiment of the present invention, the information received from the contributor workstations are files comprising one or more documents. These documents typically would contain text, data, charts, graphs, spreadsheets and the like, or combinations thereof, and may be in many formats. It will be appreciated that any information that can now or in the future be stored in digital form, such as photographs, videos, sound recordings, etc. may be stored in the files received from the contributor workstations. Also deliverable are applications and non-static data provided by corporations for both informational and transactional purposes (such as, for example, proxy statements and voting forms.)

In the representative embodiment, the repository server can provide the user with a list of new documents that have been recently received by the repository server and which that user is authorized to access. The user may also request a list of documents that fit certain user-specified search criteria. A list of the documents that match that search criteria and which the user is authorized to access is provided to the user computer. The user can then select, request and view documents from these lists.

Accordingly, the present invention is useful for both corporations and investors, as it disseminates corporate information in a timely and reliable manner, promotes an appreciation of management's performance, assists in broadening shareholder base to "secondary" institutional holders, and encourages a balanced view of the corporation. Often the annual report and other documents (which are targeted to a broad audience) and other methods of distribution may not optimally achieve these objectives.

DETAILED DESCRIPTION

The present invention supports the creation of corporate information, provides access to corporate information, and controls access to corporate information. According to the present invention, corporate information is acquired, indexed and updated.

For ease of description, the embodiment of the present invention described herein is that used for the electronic distribution of corporate information, investment research reports and morning meeting notes to investors via the Internet's World Wide Web ("WWW"). However, the invention is not so limited, and can be used, where appropriate, for the electronic distribution of other types of information via other types of networks.

Brokerage and investment banking firms spend large sums of money creating, printing and distributing thousands of graphic-rich research reports to investors (e.g., customer's, remote sales offices, investment advisors, brokers, portfolio managers, etc.) Brokerage and investment banking firms distribute their reports only to selected investors (e.g., their customers). Similarly, corporations spend large sums of money creating, printing and distributing thousands of graphic-rich annual reports and other corporate information to shareholders and other interested parties. Investors require access to these reports on a timely basis. It is also desirable to search all available reports for those reports that may be of interest to the investor. The representative embodiment of the present invention provides an advanced, secure system to distribute corporate information and research reports on a timely basis from corporations and from brokerage and investment banking firms to permitted parties and that allows those parties to access and query a database of corporate information and research reports located at a remote location.

As used herein, the terms "investor" and "user" include any end user who is permitted to receive or access information via the present invention, such as, for example, shareholders, customers of brokerage and investment banking firms, employees of brokerage and investment banking firms, employees of corporations, investment advisors, brokers, bankers, portfolio and fund managers, journalists, analysts, economists, university professors, MBA students, etc.

Figure 1:
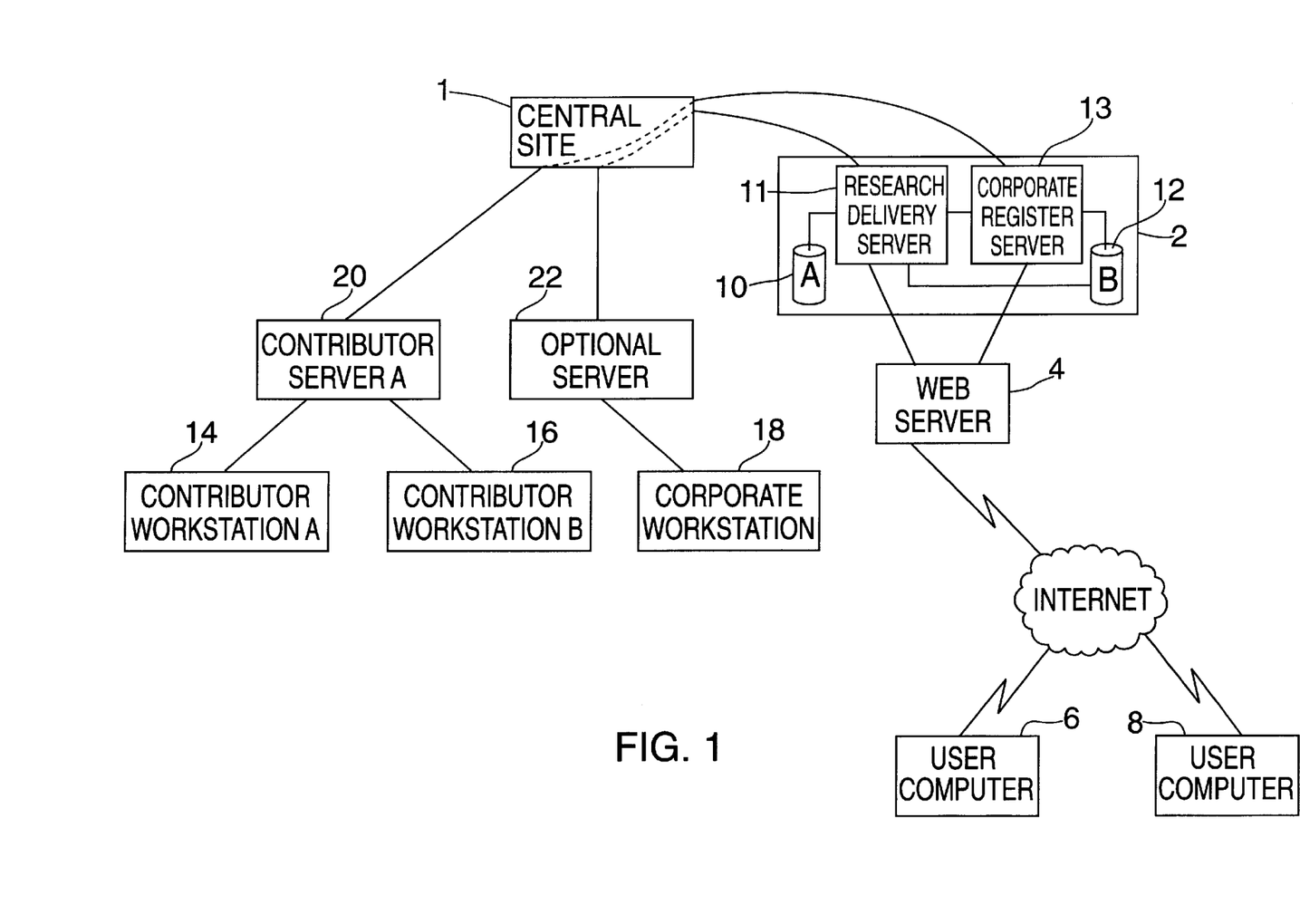
FIG. 1 is a diagram of the overall system architecture of the present invention.

Referring now to the drawings, and initially FIG. 1, there is illustrated an overall system architecture according to the present invention. A central repository server 2 is coupled, via a central site 1, to one or more remote contributor workstations 14, 16. The contributor workstations 14, 16 are used by brokerage and investment banking firms to submit investment reports to the repository server 2. Optionally, the contributor workstations 14, 16 may be coupled to the repository server 2 via proprietary network comprising a plurality of contributor servers 20. Alternatively or additionally, a contributor workstation may provide reports to the repository server 2 via the Internet.

The central repository server 2 is coupled, via a central site 1, to one or more remote corporation workstations 18. The corporation workstations 18 are used by corporations to submit corporation information to the repository server 2, as explained below. Optionally, the corporate workstations 18 are coupled to the repository server 2 via proprietary network comprising a plurality of contributor servers 22. Alternatively or additionally, a corporation workstation 18 may provide corporate information to the repository server 2 via the Internet.

In the representative embodiment, the contributor workstations 14, 16 execute a program called Multex Contributor™, described in detail in the user manual titled "MX Contributor—User Guide" available from Multex Systems, Inc. of New York, N.Y. and expressly incorporated herein by reference. The Multex Contributor™ program is a real-time Windows-based document indexing and transfer program used to disseminate reports to the central site 1. The contributor simply completes a form (a document profile) displayed on the screen of the contributor workstation 14, 16 and, at the specified time, the Multex Contributor™ program transfers the report, along with the information in the completed form, to the central site 1.

At the contributor workstation 14, 16, the contributor completes a form relating to the report. First, the contributor selects a report for distribution. The report is stored, usually as a file, in electronic form on the contributor workstation 14, 16 or on a server or network drive coupled to the contributor workstation 14, 16. The report may be in any standard electronic format, for example, Pagemaker, Microsoft Word for Windows, Corel WordPerfect, etc. The form has fields relating to the report, for example, title, author, subject, date and time of creation, distribution level (setting distribution to a default group of investors or one of a set of predefined groups of investors) and expiration time. Optionally, the contributor can enter additional information in the form, such as, for example, ticker symbol, industry group, synopsis, country, region, currency, etc.

Once the report has been selected and the form completed, the user issues a "contribute" command to the Multex Contributor™ program and the report and all the information in the form is electronically transmitted to the contributor server 20. In the representative embodiment, the reports are "pushed up" from the contributor servers 20 to the central site 1.

For corporate information, the method of acquiring content from the corporations is as follows. The Network Administrator provides corporate templates to the corporation that specifies the required information. The corporate template may be provided electronically, for example via the contributor server 22 to the corporation workstation 18. At the corporation workstation 18 for example, the corporation fills in data on the corporate template, and submits the completed template to the central site 1, e.g., via 22.

At the central site 1, the reports and corporation information are processed. Typically, the central site comprises a network of computer processors.

The Network Administrator can provide editorial assistance and modifications of the completed corporate template for normalization, consistency and quality, and can assign graphical, visual, aural and other elements to editorialize the template. The corporation will then review and approve the final editorialized corporate template, The Network Administrator supplies WWW and research delivery system (e.g. MultexNet) hyperlinks to elements in the final editorialized corporate template. The Network Administrator assigns structured fields to the final editorialized corporate template. The final editorialized corporate template is contributed as pages on a corporate register server 13 and released for indexation. In the representative embodiment, the corporate information is formatted and stored according to HTML format.

The process required to index content comprised in the corporate information is as follows. The system takes the bases URL of the final editorialized corporate template and links on that "site" are "crawled". Each page is text indexed and each text index is associated with the sub-URL of the page. Numerical data is indexed in tabular form. A structured index is built of the total "site". A media index is built of all media elements (e.g. visuals/aurals) and tabular elements.

It will be appreciated that the above editorial process adds value to the corporate information. For example, unlike existing Internet services that provide press releases to users, corporate press releases available according to the present invention have been formatted according to a standard format and relevant hypertext links have been added.

For each corporation that has an entry in the corporate register, the following information may be included:

1. A brief company profile providing the company's view of their industry, their competitive position, the attractions of their stock (e.g., strong record of dividend growth), strengths of their stock versus stock of peer group companies (e.g., higher yield), strategy, sources of growth, etc.
2. Updates that are typically mailed or blast faxed to analysts and portfolio managers on a regular basis—for example, quarterly post-earnings fax containing detailed financials and Q&A about the quarter.
3. Copies of slides from management presentations to buy and sell side.
4. Tapes (audio and/or video) of most recent post earnings or event-related conference call.
5. Any detailed information sent to analysts and portfolio managers in response to events (for example, detailed briefings on the impact of regulatory changes).
6. Annual reports and quarterlies.
7. Hot link to their web site.
8. 10-Ks, 10-Qs, proxy statements, 8 Ks and other regulatory documents.
9. Fact sheets and fact books.
10. Advertisements.
11. Press releases and other corporate announcements.
12. Prospectuses.
13. Rights plans.
14. Product and services brochures.
15. Announcements of upcoming events.
16. Newsletters.
17. Downloadable spreadsheets containing financial data on the corporation that can be manipulated by analysts.
18. Contact information and e-mail links.
19. Reprints of magazine or newspaper articles.

At the central site 1, each research report is converted in to a predetermined format. In the representative embodiment, all research reports received at the central site 1 from brokerage firms are converted at the central site 1 into a format that can be read by the Acrobat Exchange program, available from Adobe Systems, or any other report viewer/player application (e.g., .txt, .xls, .pps, etc.) The reports are then provided by the central site 1 to the repository server 2.

Where desired, the repository server 2 can also receive, store and enable the distribution of other useful information, such as, for example, news reports received from wire services, government reports, product reviews, etc.

The repository server 2 comprises or is coupled to at least two database servers 11, 13. Each database server is coupled to a database storage device 10, 12. A research delivery server and database 10, 11 stores and allows access to research reports received from brokerage firms. A corporate register server and database 12, 13 stores and allows access to corporate information received from participating corporations.

Figure 1A:
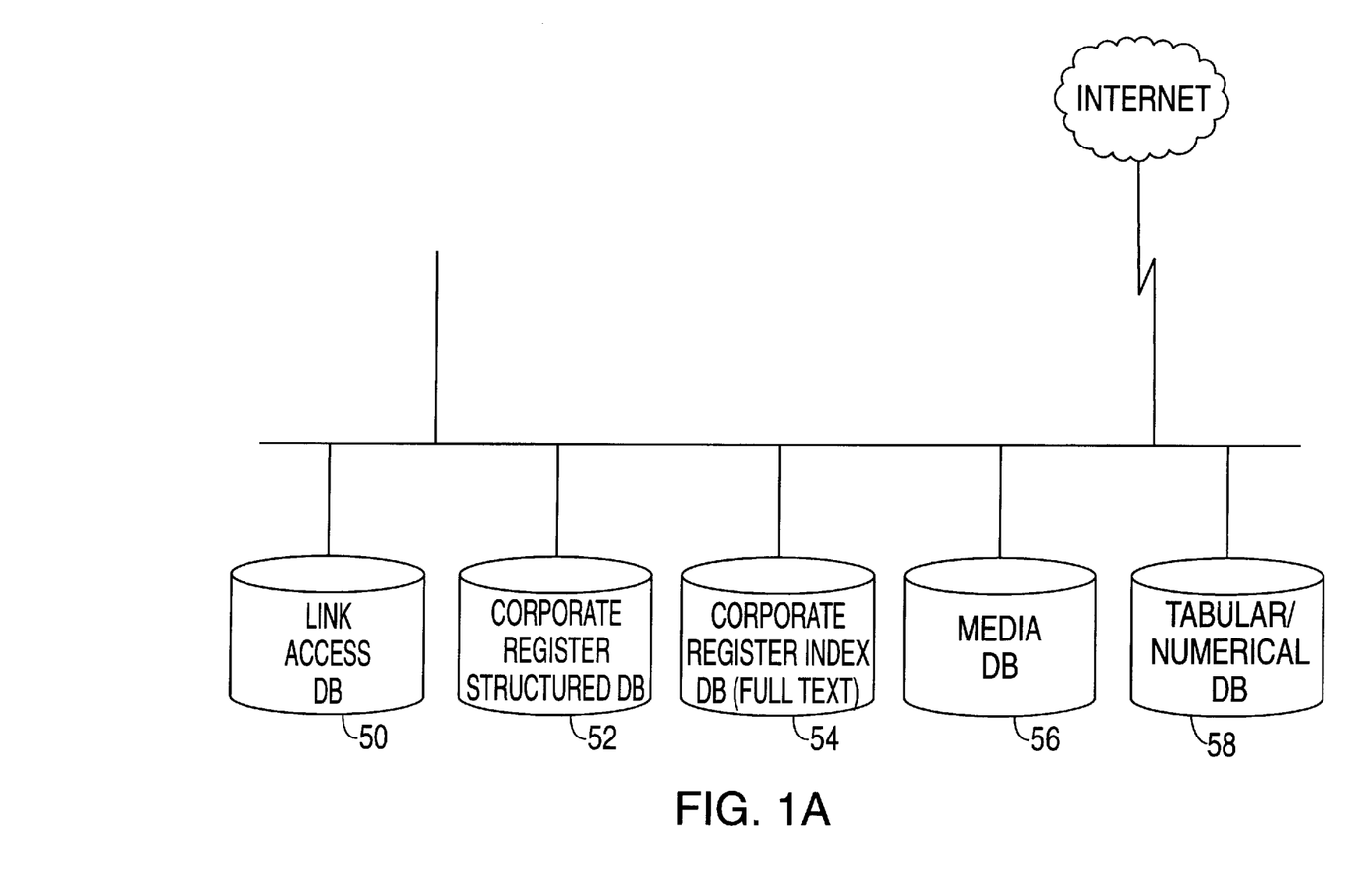
FIG. 1A is a diagram of a representative corporate register database system.

FIG. 1A shows in detail an example structure of the corporate register database 12. A link access database 50 (an SQL server) determines who is allowed to navigate web links and provides multiple routes on a single link. A corporate register structured database 52 (an SQL server) is an index that points to each element on the corporate register based on industry/ticker/personnel data/products/etc. A corporate register index database 54 is a full text index of the entire corporate register, e.g., all corporate information available (for example, a full text search engine available from Fulcrum of Ottawa, Canada). A media database 56 (an SQL server) stores all multimedia elements on all sites and indexes content based on MIME type. The media database 56 also stores indices to applications and non-static data contributed by corporations. A tabular/numerical database 58 (an SQL server) stores all numerical financial data on each corporation.

Full details of the research delivery server and database 10, 11 is provided in parent patent application, Ser. No. 08/658,966, incorporated in full herein. An example of an Internet research delivery system is Applicant's MultexNet service, as released on Jun. 5, 1996.

The repository server 2 provides investors with lists of reports and corporate information received from the workstations 14, 16, 18 and allows investors to request lists of reports and corporate information that fit certain criteria. The investor can select reports and corporate information from these lists to down-load, view and/or print. Generally, lists of reports and corporate information are generated by web server 4.

The contributor of a report or corporate information can be notified that a particular investor has accessed that report and item of corporate information. The repository server 2 maintains for each report and item of corporate information a list of those who accessed that report. The repository server 2 can transmit that list or a statistical summary of that list to preserve privacy to the contributor on a regular basis and/or when requested by the contributor.

The repository server 2 is coupled to a web server 4 which in turn is coupled to the Internet via, for example, a T1 or ISDN connection. The web server 4 is a high powered server computer that runs a web server program. In the representative embodiment, the web server 4 executes Netscape's Commerce Server program. The web server program allows web pages (in HTML format) to be accessed by investors. The web server 4 also executes other programs and subroutines as required.

Each investor has a user computer 6, 8, such as, for example, a personal computer with an Intel Pentium processor and a fast modem. In the representative embodiment, the user computer 6, 8 executes an Internet browser program, such as, for example, Netscape's Navigator 2.1 browser program. The Internet browser can read files in HTML format. In the representative embodiment, the Internet browser has access to a plug-in program that can read files in the predetermined format. In the representative embodiment, the plug-in is the Acrobat Exchange program, available from Adobe Systems that can read files in ".pdf" format. The user computer 6, 8 can connect with the Internet via, for example, a commercial Internet Service Provider.

The web server 4 includes to a web server helper application, which in the representative embodiment is the CGI (common gateway interface) program, that is activated by investors through web pages provided by the web server 4. CGI is an interface between the web server program and other programs. CGI lets those other programs process HTML forms and other data coming from Internet browsers, and then lets the other programs send a response back the web server 4 to be delivered to the Internet browser. The response can be HTML files, GIF files, PDF files or any data that the Internet browser can view. Thus, generally, when an Internet browser requests a document from the web server 4, the web server 4 server program finds the document and sends it to the Internet browser. However, if the Internet browser requests a CGI program, the web server 4 server program acts as a middleman between the Internet browser and the CGI program. Other web server helper applications, such as, for example, BGI, SAPI or ISAPI, can be used in place of CGI within the principles of the present invention.

Access to the web server 4 begins from an investor's Internet browser. Initially, the investor can access "public" web pages generally describing some of the features of the service of the present invention. If the investor chooses to proceed, the investor selects the "log-in" option from the initial web page.

User Verification: The first step the web server 4 takes in handling an investor request is verifying that the investor is permitted to access the information stored at the repository server 2. This is accomplished using the standard verification procedure built into the communication protocol between Internet browsers and web servers.

The web server 4 uses Netscape's Commerce Server's ability to call custom verification subroutines when a user tries to access CGI's and web pages. The web server 4 executes a subroutine and, using Netscape's NSAPI, receives the ID and password that the investor is asked to provide by the server/browser, and then verifies the ID and password against a database of authorized users (the user database) maintained at the repository server 2. If the user is verified, the Internet browser will be given a verification signature. An investor who is not in the user database, or enters an incorrect password, is denied access to CGI's and web pages on the web server 4 by simply having the subroutine return an "Access Denied" flag to the web server 4. This subroutine maintains an open connection to the user database to improve performance.

Whenever an investor makes a query for a list of reports, the investor's Internet browser sends an HTTP (hypertext transfer protocol) request that represents what the user wants to the web server 4. If the request does not have a verification signature attached to it, the web server 4 sends a command back to the Internet browser, causing it to prompt the user for an ID and password. The Internet browser will then return this information to the web server 4, which will verify that the user is entitled to access the reports stored at the repository server 2. If the user is verified, the Internet browser will be given a verification signature. If not, the user will be prompted again for his ID and password. Once access is verified, the web server 4 will start the CGI program named in the original HTTP request, along with any run-time parameters that are specified in the request. The CGI program first verifies that the user making the request (whose ID is passed to the CGI program by the web server 4 through an environment variable) is the only one using that ID at that moment. This is done by the following method:

a. The CGI program gets the value of the Internet browser "cookie", and extracts the value for the named pair "mxauth" from the cookie.

b. If the value is empty, the CGI program indicates that this user is accessing the web server 4 for the first time since starting his or her Internet browser. This user then becomes the designated "current user of this ID". A new random value for the "mxauth" part of the browser cookie is generated, stored on the web server 4 under this user's ID, and sent back to the Internet browser, so that the Internet browser can send it back next time.

c. If the value is not empty, the CGI program indicates that this user has previously already accessed the web server 4 since starting the browser program, and has been given an authorizing cookie. If the "mxauth" value of the cookie does not match the value stored on the web server for this user, then this user has been superseded by another user using the same ID. The CGI does not perform the requested task, and tells the user that access is denied. If the "mxauth" value of the cookie does match, then this user is authorized to continue, and the CGI performs the requested task. Each time the user is authorized to continue, the time of the access is stored on the web server 4.

d. A stored cookie value that is over an hour old is considered "stale". A user whose code does not match a stale cookie is allowed access as if the user was initially signing on, as per b. above.

Part of the rationale for this method comes from the lack of a "sign-off" from a user. When a user "leaves" the web server 4 to browse other parts of the WWW, or closes down his or her Internet browser, the web server 4 is not informed.

(For reference, it is noted that cookies are a general mechanism which server side connections, such as CGI scripts, can use to both store and retrieve information on a client side of an Internet connection. A web server, when returning an HTTP object to an Internet browser, may also send a piece of state information which the Internet browser will store. Included in the state object is a description of the range of URLs for which that state is valid. Future HTTP requests made by the Internet browser which fall within that range will include a transmittal of the current value of the state object from the Internet browser to the web server. For no compelling reason, the state object is known in the art as a "cookie.")

Other systems that allow only one instance of an ID to be active at one time rely on a "sign-off" notification to tell when the ID can be used again for "sign-on". Because the web server 4 does not receive a "sign-off", it is assumed that any new user is allowed to "sign-on" with that ID, but all others that are currently using that ID will now be denied further access, until they "sign-on" again (which involves closing down the browser, then restarting it again). Furthermore, step d. is included to keep a user from locking himself out of his own ID if he happens to use browsers from two different locations, such as home and office.

Thus, the following scenarios apply:

Scenario 1:

User 1 signs on to the web server 4 at his office. The CGI marks this browser/user ID combination as the current user.

At 5:00 PM, he goes home, without closing down his browser.

At 5:45 PM he signs on from his home computer. The CGI now marks this browser/user ID as the current user.

At 10:00 PM, he goes to bed, without turning off his browser.

At 8:00 AM the next day, he arrives at work, and tries to access the web server 4 again. Because his 10:00 PM cookie is now "stale", the CGI marks the office browser/user ID as the current user.

Scenario 2:

User 1 signs on to the web server 4 at her office. The CGI marks this browser/user ID combination as the current user.

She then goes to the desk of User 2, and shows User 2 "this new web service", using her own user ID and password to sign on to the web server 4. The CGI marks User 2's browser as the current user of User 1's ID.

After a few minutes, User 1 returns to her original computer, to find that the CGI is denying her access. User 2 has her locked out by using her ID.

This user verification system is particularly well suited in information delivery systems where a fee is charged per ID/password.

Accordingly, the present invention provides a secure way for corporations to distribute information. Thus, unlike methods of distribution where non-authorized people may intentionally or accidentally obtain access to the information (e.g., "fax blast" methods where a report may be viewed by fax operators, delivery personnel; conference calls where it is sometimes difficult for a corporation to determine and control who is participating in the call, etc.) the present invention allows corporate information to be access only by those permitted and who have the appropriate ID/password.

It will be appreciated that other security access mechanisms may be used in the future instead of or in addition to any ID/password, for example, voice recognition, handwritten signature verification, etc.

Web Server: The web server 4 uses a single CGI program that handles all the types of requests that a user makes to the web server 4. In the representative embodiment, the types of requests that the CGI program can handle are:

Return a list of reports and items of corporate information recently received at the repository server 2.

Reformat the current list of reports.

Present a form that allows the user to specify criteria for reports and/or corporate information the user wants to access.

Return a list of reports and corporate information matching the criteria in the form mentioned above.

Return a list of reports and corporate information summarized by report contributor.

Return a list of reports authored by a specific contributor.

These requests are handled similarly, except for the request for the form that the user fills in to specify criteria for reports that the user wants to access.

Except for the third request listed above, a query is formulated (whose parameters are determined by the run-time arguments given to the CGI from the original HTTP request from the investor) by the web server 4 and sent to the appropriate databases 11, 13. A result set (a list of reports and corporate information) is returned and stored in memory. The CGI then opens a HTML template form that comprises RAL (research access language, as explained in detail in the patent application and summarized below) elements, fills in each RAL element with data from the result set and sends the contents of the template to the Internet browser through the Web Server 4. (In the case of the reports that are summarized by contributor, the CGI simply condenses the list of headlines internally to summary form, before using the template.) When the output from the CGI is received at the investor's Internet browser, the browser forms it into a "page" of information, along with action buttons that the investor can select to initiate other requests.

When a query is made, the web server 2 selects the appropriate database to which the query is first routed. In summary, if the query involves text matching (e.g., a full text search) within reports, the query is passed to the full text database, e.g., 54.

In the representative embodiment, each database comprises a number of database servers networked together. (For example, database server 13 comprises a network of database servers—See FIG. 1A.) The database servers that are available to the CGI are listed in the WEBPUBL.INI file on the web server 4. When satisfying a non-text matching query, the CGI will attempt to use an SQL type server first. If that database server is not available, the CGI will automatically switch to the next available SQL database server. (If all SQL database servers are not available, then the query will be passed on to full text database server. When satisfying a text matching query, the CGI will attempt to use an full text database server. Again, if that server is not available, then its backup will be tried, and so on, until either a server can satisfy the query, or all servers have been found to be down. In addition to this automatic backup system, the CGI practices semi-random selection of servers in an effort to balance the load on the servers. This means that the order that servers are tried is not always the same.

The HTML template forms that the CGI uses for the research information delivery system rely on forms that are part of HTML. This allows the users to select buttons on the pages to submit requests. Each page may have several buttons, and the names of the buttons (the actual visible text in them) are used in the CGI to identify which button the user selected, and therefore, which action to perform. Parameters for a query are taken from other form constructs, such as text fields, list boxes, and combo boxes. When a form does not actively show a parameter value, but it would be convenient for the CGI to maintain its value for the next user request, the values are stored as "hidden" fields in the form. (A hidden field is a form construct defined in HTML for just this purpose.) This allows the parameters of a query to be stored in a page that shows the results of a query, so that they can then be used again as starting values when the user requests the report query form.

Authorization: In the representative embodiment, each user has authorization to access a subset of the information stored at the repository server 2. The contributor determines who has access to each report or item of corporate information. For example, corporation may designate that one of its briefings can be accessed only by its employees and certain investors. Another briefing may be designated as accessible by employees only. A third briefing may be released for general distribution to all who wish to access that briefing.

Every document contributed by a contributor is identified by a "contributor ID". Furthermore the document is assigned by the contributor to one or many "document groups" owned by the contributor. (Documents usually belong to one document group.)

The authorization information links an investor to a list of document groups. Each investor may be permitted to access documents in one, some or all document groups.

The repository server 2 constantly maintains an up to date list of all the report groups available. This list is updated in real time after a report is added, and completely refreshed daily (e.g., after report removal of expired reports).

To submit a query, an investor must be identified by the repository server 2. As the investor's credential are checked (see above), the authorization information is retrieved by the repository server 2. This authorization information contains a list of report groups the investor is permitted to access.

Thus, in the representative embodiment, there is a database system 10, 11 for storing research reports produced by and received electronically from brokerage firms. Each research report has associated authorization information specifying who is authorized to access that research report. Another database system 12, 13, called herein the corporate register, stores the corporate information. Each item of corporate information produced by and received from one of the plurality of corporations about itself. Each item of corporate information has associated with it authorization information specifying who is authorized to access that item of corporate information. The corporate register database system 12, 13 can also index and/or include corporate and other Internet web pages. (It will be appreciated that the present invention's architecture could easily be modified to include only one database system and storage device comprising many tables of information.)

At the user computer (e.g., 6 or 8) a research delivery user module enables users to access and search the research reports received from the brokerage firms. According to the present invention, searches conducted via the research delivery user module also (if desired and authorized) search and return items of corporate information from the corporate register.

The user computer can be thought of as having two user interfaces, namely a research delivery user module and a corporate register module. In fact, only one browser program is needed and executed by the user computer 6—however, as the present invention creates two formats of results, it is convenient to consider the user computer 6 as utilizing two interface modules.

The research delivery user module presents information to the user as in a research information delivery system. According to the representative embodiment of the present invention, there are a number of predetermined types of information displays available according to the research delivery user module. A bulletin board display outputs a list of the headlines of reports and items of corporate information that have recently been received by the repository server 2. (In these examples, "recently received" is defined to mean those that have been received that day, e.g., since midnight on today's date.). The bulletin board display can include the time of submission by the contributor, the identity of the contributor, the number of pages and size, ticker symbols related to the report or item of corporate information, whether a synopsis is available and the headline, all displayed one line per report. A query results display comprises the same fields of information, but for reports that satisfy a user's query. Each of the above two types of output can be displayed in other formats, e.g., in long form which includes a two or more line output for each report listing the headline, the time of submission of the report by the contributor, the identity of the contributor (company), the name(s) of the authors of the report, the number of pages and size of the report, ticker symbols related to the report/corporate information, whether a synopsis is available. A summary display outputs a three column table, each row listing a contributor, the number of research documents at the repository server 2 available for that user from that contributor and the number of morning notes at the repository server 2 available for that user from that contributor.

Figure 2:
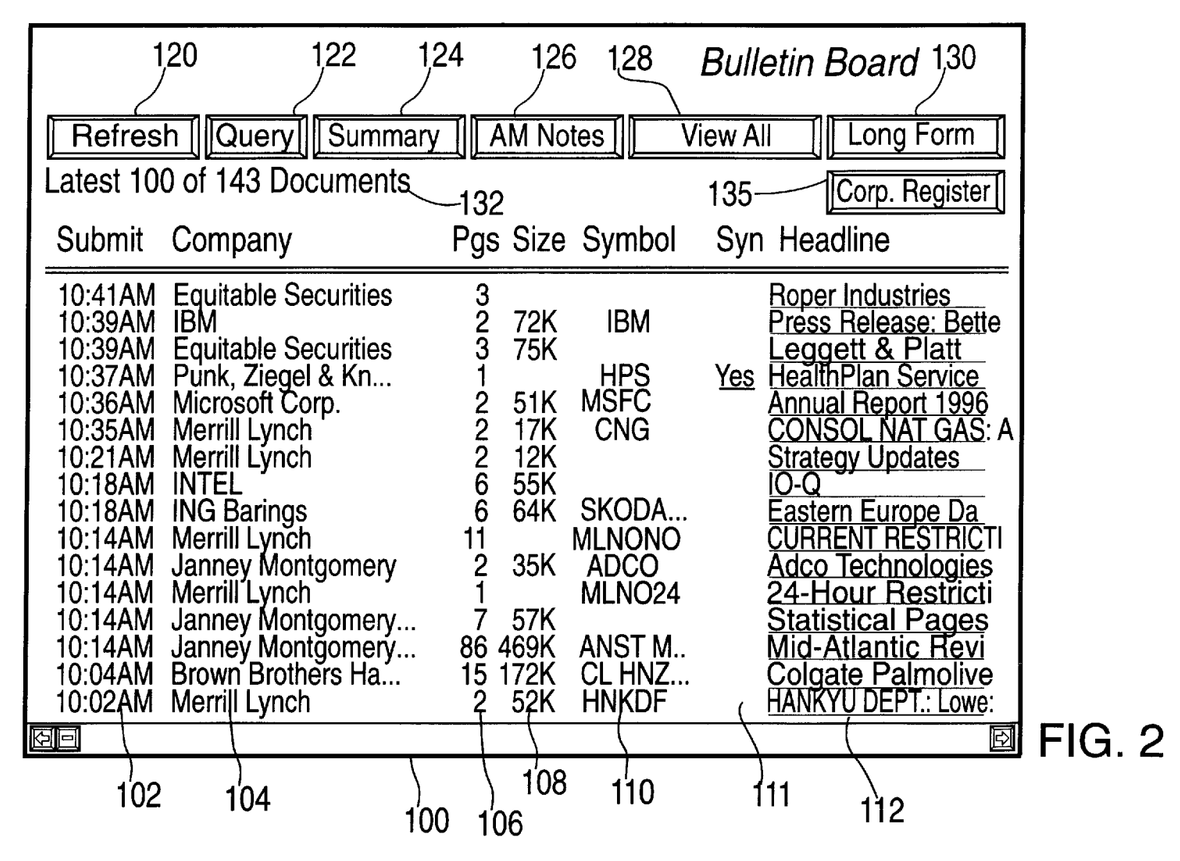
FIG. 2 is an example bulletin board screen display.

For example, as shown in FIG. 2, there is a bulletin board user interface 100 displaying recently received research reports that said user is authorized to access. Additionally, corporate information that the user is authorized to access can be displayed on the bulliten board.

As shown in FIG. 2., the page 100, displayed in bulletin board format, includes a number of action buttons 120–130, and a list of reports and items of corporate information. Each report and item of corporate information is listed on a single line, with information about it including the time of submission of the report by the contributor (102), the identity of the contributor (104), the number of pages (106) and size of the report (108), ticker symbols related to the report (110), whether a synopsis is available (111) and the report's headline (112). The user can select (e.g., click on) a headline and have the complete report transferred from the repository server 2 to the user computer 6, 8. The user can select an entry in the synopsis column and have the synopsis displayed.

A refresh button 120, if selected, cause this same report to be regenerated, e.g., to include any new reports and items of corporate information received since the this page 100 was generated. A query button 122, if selected, causes a query form to be generated. A summary button, if selected, causes a summary report to be generated. An AM Notes button 126, if selected, causes only morning notes to be displayed. A View All button 128, if selected, causes all headlines to be displayed, regardless of how many. A long form button 130, if selected, causes a page to be generated that includes a two lines for each report. A corp. register button 135, if selected, cause the research delivery system to be activated, e.g., cause the screen of FIG. 2 to be displayed.

A summary line 132 shows the total number of documents that satisfy the query (in this case, all documents and items of corporate information that arrived at the repository server 2 since midnight) and the total number displayed.

Similarly, using the research delivery user module a user can submit a query to the web server 4 and receive query results listing research reports (from 10, 11) and corporate information (from 12, 13) satisfying the query and that the user is authorized to access. The query results are displayed in a similar format to that shown in FIG. 2.

Figure 3:
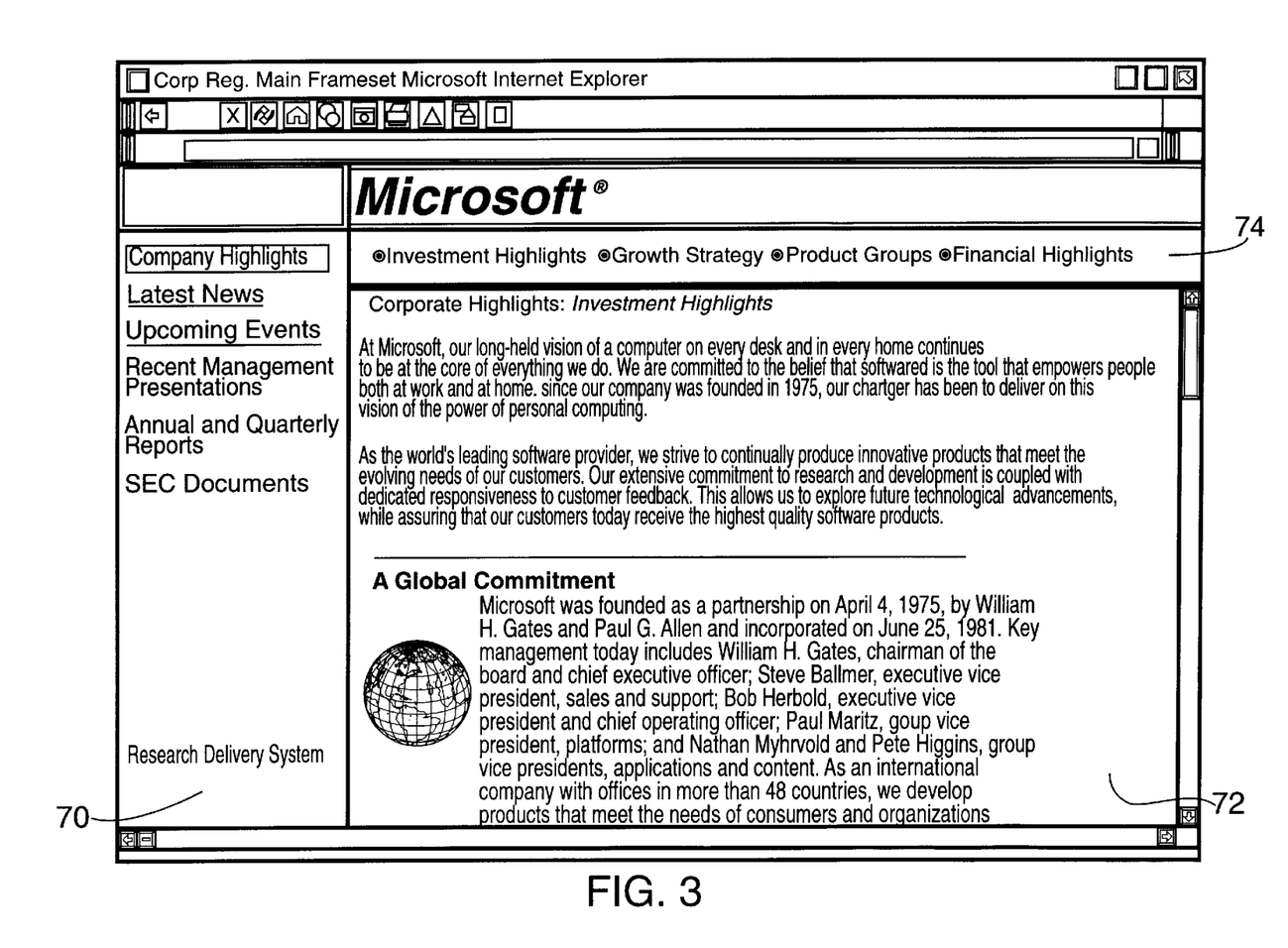
FIG. 3 is an example corporate register display screen.

The corporate register module displays corporate information. Ideally, the corporate information for each corporation is displayed according to a common format. FIG. 3 shows an example page of corporate information.

In the representative embodiment, for example, the corporate information for each corporation is arranged in two frames, namely, an index frame 70 and a contents frame 72. The index frame 70 includes topic hyperlinks to various segments or types of the corporate information, e.g., "corporate highlights", "latest news", "upcoming events", "recent management presentations", "annual and quarterly reports", and "SEC documents". Ideally, the index frame 70 will have mostly the same entries for each corporation. The index frame 70 can be displayed at all times, e.g., in a frame shown in the browser.

The contents frame 72 includes the corporate information, arranged and navigatible according to the topics listed within the index frame. Again, for consistency, similar headings 74 in each topic can be used by each corporation. For example, the "corporate highlights" topic may include headings (as hyperlinks) for "investment highlights", "growth strategy", "product groups" and "financial highlights". Selecting a heading (74) will cause the corresponding corporate information to be retrieved and displayed in the contents frame.

The actual contents (e.g., the corporate information) and the format of the actual contents as displayed in the contents frame 72 is determined by the corporation itself. Thus, the "look and feel" of the actual contents may mirror the corporation's annual report and/or reflect the style, philosophy and vision of the corporation as seen by the corporation.

Generally, provision of corporate information over the Internet to the user computers 6, 8 utilizes common Internet addressing and transfer protocols.

In the representative embodiment, each hypertext link can be subject to user entitlements. For example, depending on a user entitlement, a hypertext link may have different meanings and link to different sites for different users. The corporation provides the actual links and entitlement/access rules to the Network Administrator. Links can be a straight gateway (link or don't link) or a variable gateway (choose link appropriate to user ID). The Network Administrator gives the corporation's link to a "proxy" link. The user selects the proxy link. The web server 4 accesses the link access database 50 and determines who the user is (either using technology known as D2 supplied by VeriSign or via ID/password query) and determines the appropriate actual link. The web server routes the user accordingly.

The present invention can create web pages "on the fly", according to a research access program. The research access program provides a mechanism that enables an investor to access the information in the databases 11, 13. The research access program also implements an Internet CGI, which accepts input parameters from HTML forms, and then using templates forms, generates HTML pages comprising information retrieved from the databases 11, 13. The template forms are written in a novel computer language, called herein a "research access language" (or RAL) that describes how to integrate the information retrieved from the databases 11, 13 into this form. The template forms include RAL elements, as discussed in detail in patent application Ser. No. 08/658,966.

The present invention allows investors to submit queries and receive in response thereto a list of reports, items of corporate information and web sites that satisfy the queries. The queries are constructed from one or more search parameters, including: contributing company; which stock symbols figure prominently; when the item was published; what industries are featured; and keyword search parameters.

When using the research delivery system, an investor may enter search parameters at a user computer 6, 8 via a web page provided by the web server 4. When the investor selects the "submit" button on the web page, the search parameters are forwarded by the browser to the web server 4. The search parameters are used to form a query. The query is submitted to the appropriate database 11, 13 and a list of matching documents is generated. This list is formatted on the web server 4 into HTML form, and sent to the investor at the user computer 6, 8, where the investor's browser displays the list to the investor.

Although the invention has been described with reference to a particular embodiment and arrangement of parts, features and the like, the above disclosure is not intended to exhaust or limit all possible embodiment, arrangements or features, and indeed, many other modifications and variations will be ascertainable to those skilled in the art. For example, the repository server 2 may distribute reports by other networks in addition to the Internet. It is noted that the web server 4 and repository server 2 of the representative embodiment of the present invention can be implemented utilizing a logic circuit or a computer memory comprising encoded computer-readable instructions, such as a computer program. The functionality of the logic circuit or computer memory has been described in detail above. Generally, the present invention has practical application as it enables reports and other information to be distributed speedily and searched efficiently by authorized users in remote locations.

As another example of the broad application of the present invention, the corporate register of the present invention could be implemented and/or integrated with non-Internet delivery mechanisms, such as, for example, intranets, proprietary networks (e.g., Multex Publisher, Bloomberg, Reuters Broker Research), and the like. Thus, references to research delivery systems and research delivery module should be understood to include such other delivery mechanisms.

Thus, the above described embodiments are merely illustrative of the principles of the present invention. Other embodiments of the present invention will be apparent to those skilled in the art without departing from the spirit and scope of the present invention.

What is claimed is:

1. An integrated computer-implemented corporate information delivery system, comprising:

a first database for storing research reports produced by and received electronically from brokerage firms and including authorization information specifying who is authorized to access each of said research reports;

a second database for storing a plurality of corporate information about a plurality of corporations, each item of corporate information produced by and received from one of the plurality of corporations about said corporation and including authorization information specifying who is authorized to access said item of corporate information;

a research delivery module coupled to the first database and the second database, the research delivery module having a bulliten board user interface displaying to a user recently received research reports that said user is authorized to access and corporate information and having a query user interface allowing a user to submit a query and receive query results listing research reports and corporate information satisying the query and that the user is authorized to access; and a corporate register module coupled to the second database for outputting corporate information, the corporate information output for display according to a common format.

2. The system of claim 1 wherein the corporate information is formatted according to a hypertext markup language and includes hypertext links to related information.

3. The system of claim 1 wherein the corporate information is formatted according to a hypertext markup language and when displayed in the corporate register module includes hypertext links to said corporation's Internet site.

4. The system of claim 2 wherein the research reports are formatted according to a page description format.

5. The system of claim 4 wherein the research delivery module includes a display module for reading and displaying documents in a page description format.

6. The system of claim 1 wherein the first database and the second database are located at a remote location from the research delivery module and the corporate register module.

7. The system of claim 6 wherein the first database and the second database are coupled to the research delivery module and the corporate register module via a web server.

8. The system of claim 1 wherein the query results are selectable hyperlinks causing a selected research report to be displayed according to the research delivery module and causing a selected item of corporate information to be displayed according to the corporate register module.

9. An integrated computer-implemented corporate information delivery system, comprising:

a database for storing (a) research reports produced by and received electronically from brokerage firms and including authorization information specifying who is authorized to access each of said research reports, and (b) a plurality of corporate information about a plurality of corporations, each item of corporate information produced by and received electronically from one of the plurality of corporations about said corporation and including authorization information specifying who is authorized to access said item of corporate information;

a research delivery module coupled to the database, the research delivery module allowing a user to submit a query and receive query results listing research reports and corporate information satisfying the query and that the user is authorized to access; and a corporate register module coupled to the database for outputting corporate information, the corporate information output according to a common format.

10. The system of claim 9 wherein the corporate information is formatted according to a hypertext markup language and includes hypertext links to related information.

11. The system of claim 9 wherein the corporate information is formatted according to a hypertext markup language and when displayed according to the corporate register module includes hypertext links to said corporation's Internet site.

12. The system of claim 11 wherein the research reports are formatted according to a page description format.

13. The system of claim 12 wherein the research delivery module includes a display module for reading and displaying research documents in a page description format.

14. The system of claim 9 wherein the database is located at a remote location from the research delivery module and the corporate register module and is coupled electronically thereto by a computer network.

15. The system of claim 9 wherein the query results are selectable hyperlinks when selected by a user causing a selected research report to be displayed according to the research delivery module and causing a selected item of corporate information to be displayed according to the corporate register module.

16. The system of claim 15 wherein the corporate register module includes a hypertext link to the research delivery module.

17. The system of claim 9 wherein the research delivery module includes a bulletin board display.

18. The system of claim 9 further comprising a feedback module coupled to the corporate register module for providing a corporation with statistics concerning access of said corporation's corporate information.

19. An integrated computer-implemented corporate information communication and delivery system, comprising:

a database for storing (a) research reports produced by and received electronically from brokerage firms and including authorization information specifying who is authorized to access each of said research reports, (b) a plurality of corporate information about a plurality of corporations, each item of corporate information produced by and received electronically from one of the plurality of corporations about said corporation and including authorization information specifying who is authorized to access said item of corporate information, and (c) corporate website information;

a research delivery module coupled to the database, the research delivery module allowing a user to submit a query and receive query results listing as selectable hypertext those research reports, corporate information and corporate website information satisfying the query and that the user is authorized to access; and a corporate register module coupled to the database for outputting corporate information, the corporate information output according to a common format.

20. The system of claim 19 further comprising a feedback module coupled to the corporate register module for providing a corporation with statistics concerning access of said corporation's corporate information.

21. An integrated computer-implemented corporate information delivery system, comprising:

a database for storing (a) research reports produced by and received electronically from brokerage firms and including authorization information specifying who is authorized to access each of said research reports, and (b) a plurality of corporate information about a plurality of corporations, each item of corporate information produced by and received electronically from one of the plurality of corporations about said corporation and including authorization information specifying who is authorized to access said item of corporate information, each item of corporate information including hypertext links, each hypertext link dynamically created for each user and linking to a location specified according to the user's entitlements;

a research delivery module coupled to the database, the research delivery module allowing a user to submit a query and receive query results listing research reports and corporate information satisfying the query and that the user is authorized to access; and a corporate register module coupled to the database for displaying corporate information, the corporate information displayed according to a common format and enabling the user to navigate via hypertext links.

22. The system of claim 21 wherein the hypertext links include links to corporate Internet web pages.

23. The system of claim 21 wherein the hypertext links include links to corporate Intranet web pages.

24. A system for dynamically creating hypertext links in hypertext pages based upon an entitlement of a user accessing the hypertext page, comprising:

a database of entitlement information specifying entitlements of a plurality of users;

a hypertext page in electronic form, the hypertext page including at least one specification of an entitlable hypertext link, the entitlable hypertext link specifying a plurality of possible links as a function of entitlement information;

a browser for displaying the hypertext page at a user computer;

a server for receiving a request for a second hypertext page from a user upon selection of the entitlable hypertext link by the user;

means for obtaining a user identification for the user;

means for determining the entitlements of the user as a function of the user identification by accessing the database of entitlement information; and means for routing the user to a second hypertext page according to the entitlement information and one of the plurality of possible links.

25. A method for dynamically creating hypertext links in hypertext pages based upon an entitlement of a user accessing the hypertext page, comprising the steps of:

providing entitlement information specifying entitlements of a plurality of users;

providing a hypertext page in electronic form, the hypertext page including at least one specification of an entitlable hypertext link, the entitlable hypertext link specifying a plurality of possible links as a function of entitlement information;

displaying the hypertext page at a user computer;

receiving a request for a second hypertext page from a user upon selection of the entitlable hypertext link by the user;

obtaining a user identification for the user;

determining the entitlements of the user as a function of the user identification by accessing the entitlement information; and routing the user to a second hypertext page according to the entitlement information and one of the plurality of possible links.

26. The method of claim 25 further comprising the step of electronically providing the second hypertext page to the user.

27. The method of claim 25 wherein the links comprise Internet URLs.

28. The method of claim 25 wherein the hypertext page comprises a research document.

29. The method of claim 25 wherein the hypertext page comprises corporate information.

30. A method for the electronic distribution of corporate information and research reports in a timely, reliable and secure manner, comprising the steps of:

electronically receiving research reports produced by brokerage firms including authorization information specifying who is authorized to access each of said research reports;

storing the research reports and authorization information in a database;

receiving items of corporate information about corporations, each item of corporate information produced by a corporation about said corporation and including authorization information specifying who is authorized to access said item of corporate information;

storing the items of corporate information in the database;

receiving a query from a user; and outputting query results to the query listing research reports and items of corporate information satisfying the query and that the user is authorized to access.

31. The method of claim 30 further comprising the steps of:

enabling the user to select an item of corporation information;

accessing the database to obtain the selected item of corporate information; and outputting the selected item of corporate information.

32. The method of claim 31 wherein the step of outputting the selected item of corporate information further comprises the step of displaying the item of corporation information according to a common format.

33. The method of claim 30 wherein the step of storing the items of corporate information further comprises the step of storing the items of corporate information formatted according to a hypertext markup language and includes hypertext links to related information.

34. A method for electronically and securely providing corporate information to investors at remote locations, comprising the steps of:

providing a blank corporate template to a corporation, the corporate template specifying an output format;

at the corporation, completing the blank corporate template to produce an item of corporate information comprising information about said corporation formatted according to the output format and entitlement information;

receiving the item of corporate information at a central site;

assigning structured fields to the item of corporate information;

storing the item of corporate information in a database at the central site;

receiving a query from a remote investor;

determining whether the item of corporate information satisfies the query;

determining whether the investor is entitled to access the item of corporate information by examining the entitlement information; and if the item of information satisfies the query and the investor is entitled to access the item of corporate information, electronically providing the item of corporate information to the investor.

35. The method of claim 34 further comprising the step of outputting the item of corporate information at a computer.

* * * * *